(12) United States Patent
Atsmon et al.

(10) Patent No.: US 9,600,829 B2
(45) Date of Patent: Mar. 21, 2017

(54) SYSTEM AND METHOD FOR IDENTIFYING A MARKETPLACE STATUS

(71) Applicants: Alon Atsmon, Greenwich, CT (US); Nimrod Shkedy, Tel-Aviv (IL)

(72) Inventors: Alon Atsmon, Greenwich, CT (US); Nimrod Shkedy, Tel-Aviv (IL)

(*) Notice: Subject to any disclaimer, the term of this patent is extended or adjusted under 35 U.S.C. 154(b) by 0 days.

(21) Appl. No.: 14/556,163

(22) Filed: Nov. 30, 2014

(65) Prior Publication Data

US 2015/0088605 A1    Mar. 26, 2015

Related U.S. Application Data

(63) Continuation of application No. 13/586,912, filed on Aug. 16, 2012, now Pat. No. 8,908,927, which is a continuation of application No. PCT/IB2011/050661, filed on Feb. 17, 2011.

(60) Provisional application No. 61/325,328, filed on Apr. 18, 2010, provisional application No. 61/306,510, filed on Feb. 21, 2010, provisional application No. 61/305,147, filed on Feb. 17, 2010.

(51) Int. Cl.
*G06K 9/00* (2006.01)
*G06Q 30/02* (2012.01)
*G06K 9/62* (2006.01)

(52) U.S. Cl.
CPC ....... *G06Q 30/0201* (2013.01); *G06K 9/6215* (2013.01); *G06Q 30/02* (2013.01)

(58) Field of Classification Search
None
See application file for complete search history.

(56) References Cited

U.S. PATENT DOCUMENTS

| 5,841,883 | A | 11/1998 | Kono et al. |
|---|---|---|---|
| 2002/0055092 | A1 | 5/2002 | Hochman |
| 2003/0036855 | A1 | 2/2003 | Harris et al. |
| 2005/0021561 | A1* | 1/2005 | Noonan ............. G06Q 30/06 |
| 2005/0072935 | A1 | 4/2005 | Lussier |
| 2005/0180608 | A1 | 8/2005 | Tanabata et al. |
| 2005/0228264 | A1 | 10/2005 | Grichnik |

(Continued)

FOREIGN PATENT DOCUMENTS

| CN | 201298866 | 8/2009 |
|---|---|---|
| WO | WO 2009/050729 | 4/2009 |
| WO | WO 2010/101460 | 9/2010 |

OTHER PUBLICATIONS

International Preliminary Report on Patentability Dated Aug. 30, 2012 From the International Bureau of WIPO Re. Application No. PCT/IB2011/050661.

(Continued)

*Primary Examiner* — Tahmina Ansari

(57) ABSTRACT

A system for diagnosing an object that includes a preset of an object, a visual representation associated with one or more sub objects of at least part of the object, and a module to analyze the applicable visual representation. The visual representation is captured by a device and provides a specified status of the object. Further the analysis provides a measure of fit between the preset and the specified status of the object as captured and is carried out based on keypoint descriptors used to separate sub objects on the applicable visual representation. The device has a reproduction capturing device and data connectivity.

22 Claims, 3 Drawing Sheets

(56) References Cited

U.S. PATENT DOCUMENTS

| | | | |
|---|---|---|---|
| 2006/0095949 | A1 | 5/2006 | Whish-Wilson et al. |
| 2006/0102851 | A1 | 5/2006 | Jalink et al. |
| 2006/0247514 | A1 | 11/2006 | Panasyuk et al. |
| 2008/0306787 | A1* | 12/2008 | Hamilton ............... G06Q 10/06 705/7.38 |
| 2009/0059270 | A1* | 3/2009 | Opalach ............... G06Q 10/087 358/1.15 |
| 2009/0136093 | A1 | 5/2009 | Hartlove |
| 2010/0109946 | A1 | 5/2010 | Pande |
| 2010/0306012 | A1 | 12/2010 | Zyskowski et al. |
| 2010/0329536 | A1 | 12/2010 | Muschler et al. |
| 2011/0007151 | A1 | 1/2011 | Goldberg |
| 2011/0117025 | A1 | 5/2011 | Dacosta et al. |
| 2011/0282811 | A1 | 11/2011 | Perner |
| 2012/0018356 | A1 | 1/2012 | Jalink et al. |
| 2012/0308086 | A1* | 12/2012 | Atsmon ............... G06Q 30/02 382/110 |

OTHER PUBLICATIONS

International Search Report and the Written Opinion Dated Jul. 11, 2011 From the International Searching Authority Re.: Application No. PCT/IB2011/050661.
Notice of Allowance Dated Aug. 4, 2014 From the US Patent and Trademark Office Re. U.S. Appl. No. 13/586,912.
Official Action Dated Feb. 12, 2014 From the US Patent and Trademark Office Re. U.S. Appl. No. 13/586,912.
Supplemental Notice of Allowability Dated Sep. 17, 2014 From the US Patent and Trademark Office Re. U.S. Appl. No. 13/586,912.
Burroni et al. "Melanoma Computer-Aided Diagnosis: Reliability and Feasibility Study", Clinical Cancer Research,10(6): 1881-1886, Mar. 15, 2004. p. 1881, col. 1, col. 2 Last Para.
Office Action Dated May. 11, 2015 From the Israel Patent Office Re. Application No. 221526 and Its Translation Into English.
Office Action Dated Jan. 26, 2016 From the Israel Patent Office Re. Application No. 221526 and Its Translation Into English.

* cited by examiner

SYSTEM AND METHOD FOR IDENTIFYING A MARKETPLACE STATUS

RELATED APPLICATIONS

This application is a continuation of U.S. patent application Ser. No. 13/586,912 filed on Aug. 16, 2012, which is a continuation of PCT Patent Application No. PCT/IB2011/050661 having International filing date of Feb. 17, 2011, which claims the benefit of priority under 35 USC §119(e) of U.S. Provisional Patent Application Nos. 61/325,328 filed on Apr. 18, 2010, 61/306,510 filed on Feb. 21, 2010 and 61/305,147 filed on Feb. 17, 2010. The contents of the above applications are all incorporated by reference as if fully set forth herein in their entirety.

BACKGROUND

Technical Field

The present invention relates to the field of visual data analysis and more particularly, to visual representation analysis that provides a diagnosis based on the difference between specified status of an object and desired status of the object, in real time.

Discussion of Related Art

There are many algorithms in use and known in the art, that calculate a level of visual similarity between two images. None goes the extra mile and analyze the data of the level of similarity to provide information in real time.

The information provided may benefit businesses as well as customers in decision making and problems solving.

BRIEF SUMMARY

Embodiments of the present invention provide a system for diagnosing an object. Accordingly, according to an aspect of the invention, the system further comprises (i) a preset of an object; (ii) a visual representation associated with one or more sub objects of at least part of the object; and (iii) a module to analyze an applicable visual representation. The analysis is based on keypoint descriptors that are used to separate sub objects on the applicable visual representation. Moreover, the analysis provides a level of visual similarity between the preset and the specified status of the object as captured in real time.

According to some embodiments of the invention, the visual representation is captured by a device. The device may be a mobile device that is associated with a reproduction capturing device and wireless connection.

According to some embodiments of the invention, the object may be at least one of: (i) an arrangement of products on a marketplace; (ii) a plant; and (iii) a vertebrate.

According to some embodiments of the invention, the analysis may provide prognosis and remedy to diseases of plants or vertebrates.

According to some embodiments of the invention, the object may be an arrangement of products in storage and the preset may be full inventory as determined for the storage.

According to yet another embodiment of the invention, the object may be an arrangement of products for display for sale which is compared with a preset provided by a supplier. An analysis of the comparison may provide buying patterns of the products.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
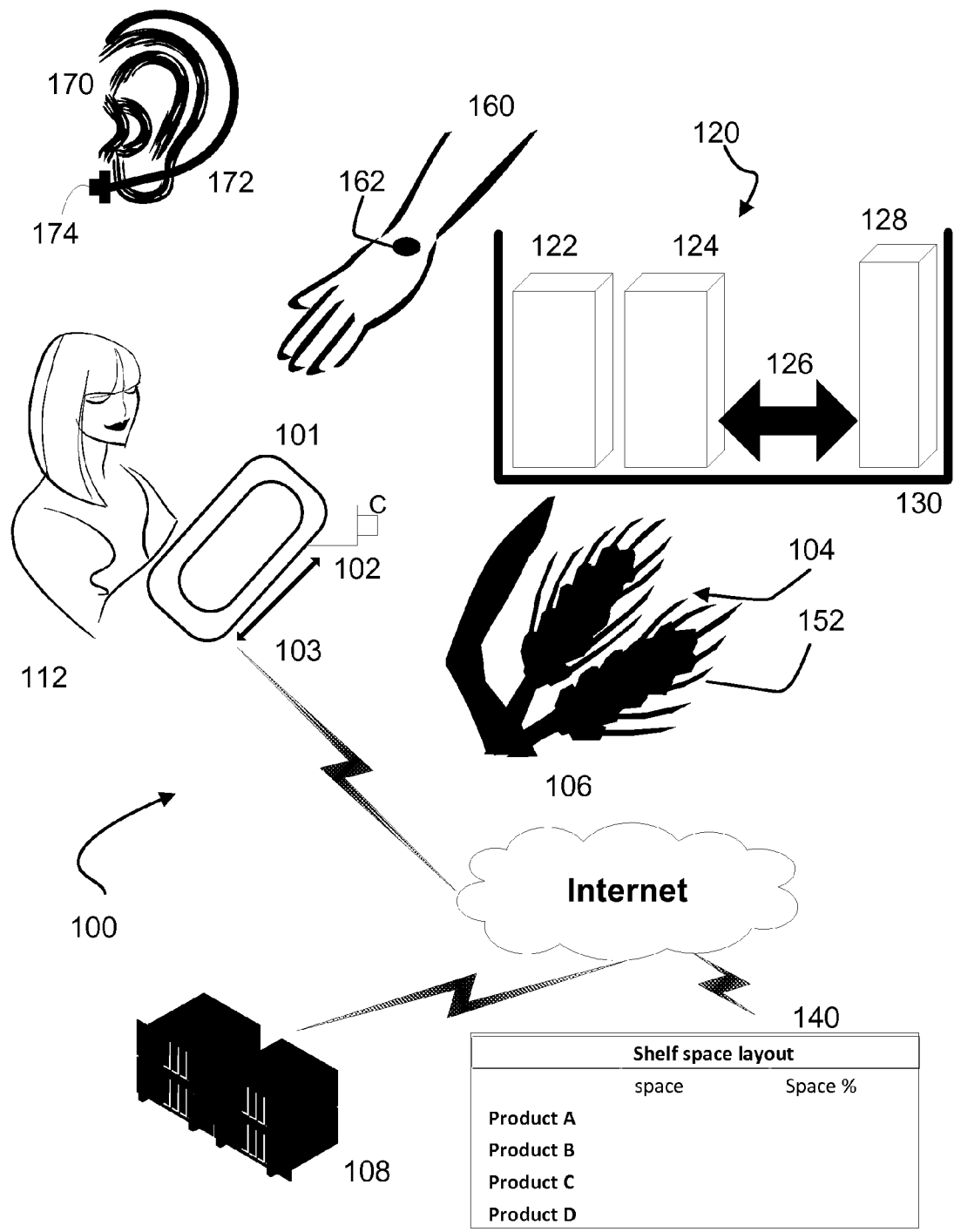
FIG. 1 shows a visual representation capturing and analysis, according to some embodiments of the invention.

Prior to setting forth the detailed description, it may be helpful to set forth definitions of certain terms that will be used hereinafter.

As used herein, the term "visual representation" encompasses a content that includes visual information such as images (in any wavelength including: (i) visible light; (ii) Infrared; and (iii) Ultraviolet), photos, videos, Infrared image, magnified image, an image sequence or, three-dimensional Images or Videos, TV broadcast.

As used herein, the phrase "visual similarity" refers to, the measure of resemblances between two visual representations that may be comprised of: (i) the fit between their color distributions such as the correlation between their HSV color histograms; (ii) the fit between their texture; (iii) the fit between their shapes; (iv) the correlation between their edge histograms; (v) face similarity; and (vi) methods that include local descriptors.

As used herein, the term "visual analysis" refers to the analysis of the characteristics of visual representations such as: (i) visual similarity; (ii) coherence; (iii) hierarchical organization; (iv) concept load or density; (v) feature extraction; and (vi) noise removal.

As used herein, the term "applicable visual analysis" refers to a sufficient visual representation for analysis.

As used herein, the term "text similarity" refers to the measure of pair-wise similarity of strings. Text similarity may score the overlaps found between pair strings based on text matching. Identical strings may have a score of 100%, while the pair strings, "car" and "dogs" will have a score close to zero. The pair strings, "Nike Air max blue" and "Nike Air max red" may have a score between zero and 100%.

As used herein, the term "regular expression" refers to a string that provides a concise and flexible means for identifying strings of text of interest, such as: (i) particular characters; (ii) words; and (iii) patterns of characters.

As used herein, the term "text analysis" as used herein refers to the analysis of the structural characteristics of text, such as: (i) text similarity; (ii) coherence; (iii) hierarchical organization; and (iv) concept load or density. The text analysis may use regular expressions.

As used herein, the term "symbol analysis" refers to analysis of symbolic data such as: (i) optical character recognition; (ii) hand write recognition; (iii) barcode recognition; and (iv) QR code recognition.

As used herein, the term "capturing data analysis" refers to the analysis of capturing data such as: (i) X-Y-Z coordinates; (ii) 3 angles; (iii) manufacturer; (iv) model; (v) orientation (rotation) top-left; (vi) software; (vii) date and time; (viii) YCbCr Positioning centered; (ix) Compression; (x) x-Resolution; (xi) y-Resolution; (xii) Resolution Unit; (xiii) Exposure Time; (xiv) FNumber; (xv) exposure Program; (xvi) Exit Version; (xvii) date and time (original); (xviii) date and time (digitized); (xix) components configuration Y Cb Cr; (xx) Compressed Bits per Pixel; (xxi) Exposure Bias; (xxii) MaxAperture Value; (xxiii) Metering Mode Pattern; (xxiv) Flash fired or not; (xxv) Focal Length; Maker Note; (xxvi) Flash Pix Version; (xxvii) Color Space; (xxviii) Pixel X Dimension; (xxix) Pixel Y Dimension; (xxx) File Source; (xxxi) Interoperability Index; (xxxii) Interoperability Version; and (xxxiii) derivatives of the above such as acceleration in the X-axis.

As used herein, the term "location based analysis" refers to analysis of local data such as: (i) Global Positioning System (GSM) location; (ii) triangulation data such as GSM network or Wi-Fi network triangulation data; (iii) data of Radio Frequency Identification; and (iv) street address. For example, location data may identify a marketplace or even the specific part of the marketplace in which the visual representation was captured.

As used herein, the term "content analysis" refers to the combination of: (i) text analysis; (ii) visual analysis; (iii) symbol analysis; (iv) location based analysis; (v) capturing data analysis, and (vi) analysis of other data. The other data may be: (i) numerical fields (e.g. price range); (ii) date fields; (iii) logical fields (e.g. female/male); (iv) arrays and structures; and (v) analysis of historical data.

As used herein, the term "match" refers to a numerical value that describes the results of content analysis that measures the match between two items. For example the correlation between two or more visual representations. The term "match" may also refer to a logical value that is true in case the similarity is above a certain threshold.

As used herein, the term "marketplace" refers to a physical place where objects may be purchased. For example: (i) a supermarket; (ii) a convenience store; and (iii) a grocery store.

As used herein, the term "keypoint descriptor" refers to a vector describing the area of a specific point in an image and is used to distinguish between different objects such as the keypoint descriptors used in Scale-invariant feature transform. For example, in the Scale-Invariant Feature Transform (SIFT) framework the feature descriptor is computed as a set of orientation histograms on neighborhoods. The orientation histograms are relative to the keypoint orientation and the orientation data comes from the Gaussian image closest in scale to the keypoint's scale. Just like before, the contribution of each pixel is weighted by the gradient magnitude, and by a Gaussian with σ 1.5 times the scale of the keypoint. Histograms contain 8 bins each, and each descriptor contains an array of 4 histograms around the keypoint. This leads to a SIFT feature vector with (4×4×8=128 elements). As used herein, the term "planogram" refers to a diagram of fixtures and products that illustrates how and where products may be arranged. It is commonly displayed on a store shelf.

As used herein, the term "mobile device" refers to a computing device that is using a cellular network. Commonly weighs less than 300 grams.

As used herein, the term "crowdsourcing" refers to a task contributed by a large diffused group of people. Commonly, the group of people is not employed by an entity that is receiving the contribution and is not scheduled to contribute at a specific time.

As used herein, the term "parallel algorithm" refers an algorithm which can be executed a piece at a time on many different processing devices, and then put back together again at the end to get the correct result. For example, parallel SIFT.

As used herein, the term "Graphics Processing Unit (GPU)" refers to an apparatus adapted to reduce the time it takes to produce images on the computer screen by incorporating its own processor and memory, having more than 16 CPU cores, such as GeForce 8800. GPU is a good mean for executing parallel algorithms.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1 which illustrates a system and process in accordance with an exemplary embodiment of the invention. System 100 performs the process described hereinafter: capturing device 101, in a non limiting example, a mobile phone with a reproduction capturing device 102 or a reproduction capturing device captures a visual representation, namely a photo, of scenes 120. Scene 120 may be a shelf space in a marketplace in which 130 will be the shelf body, 122 and 124 will be products of type A, 128 may be product of type B and 126 will be the space between them, or a stand in a marketplace. The mobile phone may weigh less than 300 grams.

Alternatively, the scene may be 104 a plant comprising of sub-objects such as 152. Further, 104 may be a scene of: (i) a plant such as crop; (ii) non-crop or an unwanted herb; (iii) an ill part of a leaf, namely an infected leaf of a plant; and (iv) a leaf infected with aphid or an unwanted herb.

Yet, in another non limiting example, the scene may be 160, a body part with a mole 162 as a sub-object.

In a non limiting example, the capturing is performed by a device attached to a part of a human body such as an ear 170 having an earpiece 172 equipped with a camera 174 operating in the same manner as 102. The device may also be implanted into a human body such as a camera implanted to replace a human retina. The capturing may be crowdsourced. For example, by a crowd of people having devices such as 174. Furthermore, the capturing may be performed in a passive manner while user 112 is shopping with no premeditation of capturing photos.

Yet, in another non limiting example, the capturing is performed by a crowd of people incentivized to capture shelf spaces. The crowd may be incentivized by monetary compensation or just by being given credit. The crowd may not be in work relationship with the entity collecting the data. Further, majority voting and outliers removal may be taken to improve data quality. Lastly, the crowd may identify presence of new products on the shelf.

The capturing may be performed in several ways: (i) taking a photograph; (ii) taking a video; (iii) contentiously capturing an image while local or remote processing provides a real time feedback in a non limiting example: "verified" or "a problem was found". The continuous capturing process may be performed while moving the reproduction capturing device such as moving in the directions shown in element 103.

The visual representation may be captured from a static reproduction capturing device placed in the marketplace or from a reproduction capturing device held by person. For example, a static camera on supermarket may take continuous photos of a shelf space. An analysis as in steps 204 or 207 in FIG. 2 may present the following: (i) product 120 is in shortage of the shelf; (ii) red products are bought on valentines more than the average; (iii) shirts with stripes are bought more than one color shirts; (iv) low stature people such as kids tend to stare at a specific shelf; and (v) search for optimal planogram that yields more purchases than other planograms.

Person 112 may be an employee or a crowd of people that were pledged an incentive for capturing the visual representation.

Figure 2:
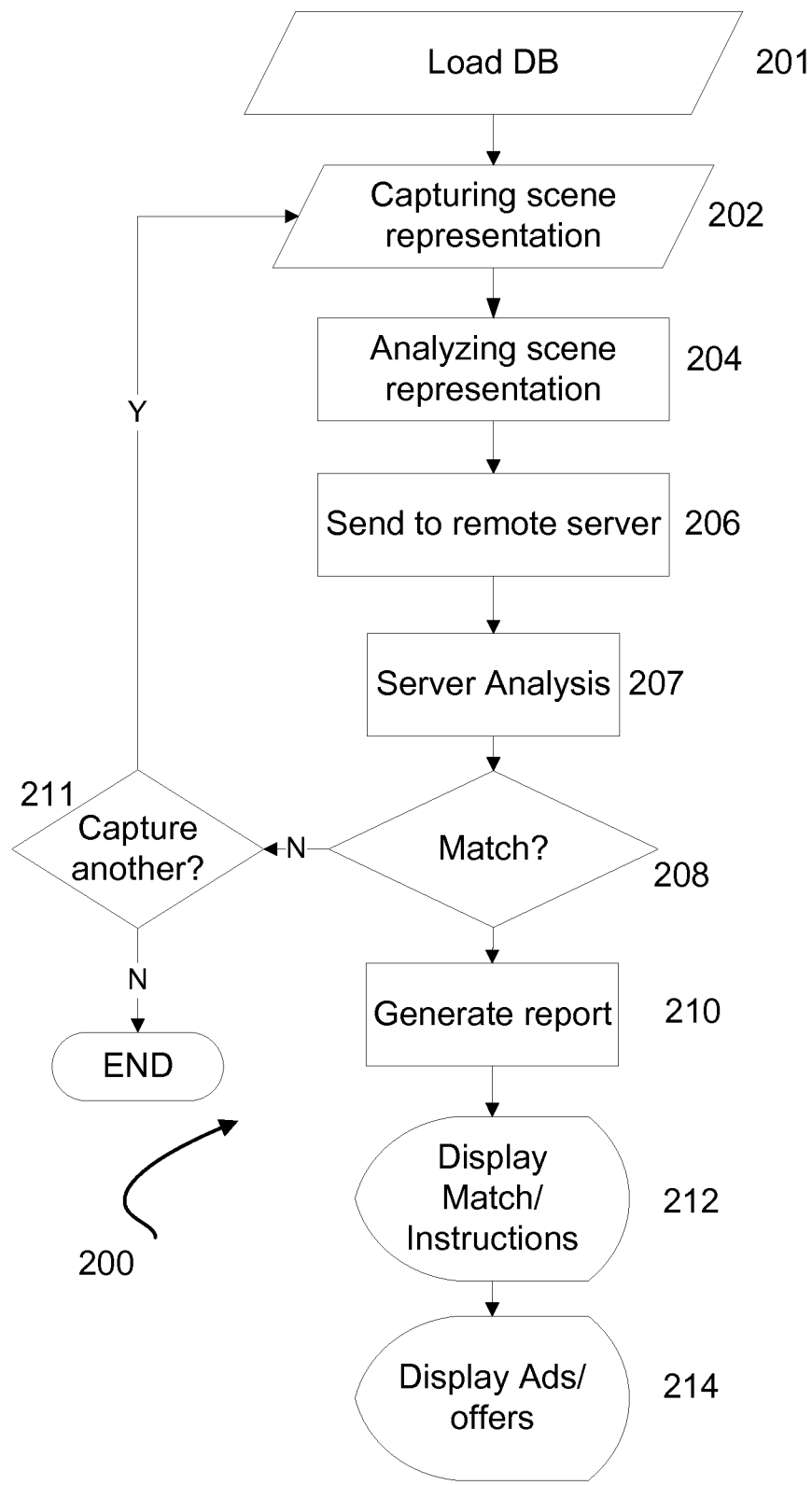
FIG. 2 is a flowchart of a method illustrating a method of capturing and matching a visual representation, according to some embodiments of the invention.

The visual representation may be processed locally using 101 or be sent (as shown in step 206 of FIG. 2 to a local or a remote server 108 over a data connectivity 106 such as the Internet. The results of the processing may be a match to a disease of the plant, after which it may be presented back on device 101.

Alternatively, in a non limiting example, server 108 or device 101 may generate a shelf space report 140 that is sent over the Internet and displayed on the device 101. Report 140 may display one of: (i) an absolute and relative shelf space of each product; and (ii) product category including the share of empty space 126. Report 140 may also be presented as a planogram.

In a non limiting example, a person may capture a visual representation of shelf space 126 with a Mobile device 101. The visual representation may be sent to a remote server 108 that uses a product database to match the products photographed to a product database. Then, a shelf space report 140 may be generated. Further, one of: device 101 and server 108 are optionally comprised of a parallel computing device such as a GPU.

In yet another non limiting example, a farmer 112 may capture a visual representation of an aphid of a leaf 152 with mobile device 101. The visual representation may be sent to a remote server 108 that utilizes aphid database to match the visual representation to a specific aphid or an aphid category. Then, an aphid information web site may display it on a mobile device and a specific insecticide is suggested for purchase. The insecticide may be purchased in bulk in a non limiting example, in a discount, by the provider of system 100 and may be sold in retail price to the farmer 112. The purchase is may be completed using device 101.

FIG. 2 is a flowchart of a method that performs capturing and matching of a visual representation, according to some embodiments of the invention. The flowchart illustrates process 200 to capture and match visual representations. In a non limiting example, a planogram and a product database including photos of a plurality of products from one or more sides are first loaded. Then, a visual representation of 104 may be captured (202). Then, capture visual representation, namely an image, may be analyzed locally (204) to provide a match using content analysis or to reduce the size of the data to be sent to the servers in step 206.

Alternatively, in a non limiting example, the image itself or a processed part of it may be sent to a remote server (206). The server may perform server content analysis (207) for one of: (i) generating report 140; (ii) calculating a match between the planogram loaded in step 201 and the actual shelf plan calculated from the object captured in 202. In a non limiting example, the analysis may use the visual representation as well as other data such as: (i) Global Positioning System (GPS) data; and (ii) the history of the sender. In case a specified criterion is met, such as a match to predefined planogram is found (208), report 140 is generated (210). Then, report 140 may be displayed (212) on device 101. Further, ads and offers may be displayed (214).

In case the system recognize from the capturing data that flash technique was used it may automatically correct the image to minimize the distortion caused by the flash.

In case no match is found, a check may be performed whether another capturing should be performed (211). The mismatch may be displayed on device 101. The check may be with the user of device 101 using its reproduction capturing device, or check against a timer that allows for image to be captured for up to 10 seconds. In case check results are positive step 202 is performed again, if not the process ends.

In a non limiting example, the analysis may adventitiously provide the amount of products of each different color or texture having the same barcode.

In yet another non limiting example, the analysis may adventitiously verify a preset designed and paid for by a supplier, namely a planogram, compared with specified status of products as positioned on a shelf in a store.

In a non limiting example, various factors provide a quick response. For example, a database is stored locally on device 101, so device 101 may use parallel matching algorithm on a multicores such as GPU. The factors may reduce duration time for user 112 to receive a feedback in real time reaction, which provides user 112 the choice to make a quick decision on the spot. For example, the user may decide in real time, whether the planogram he requested was properly executed by the store. The feedback is provided in 1, 3 or 5 seconds from the capturing.

Figure 3:
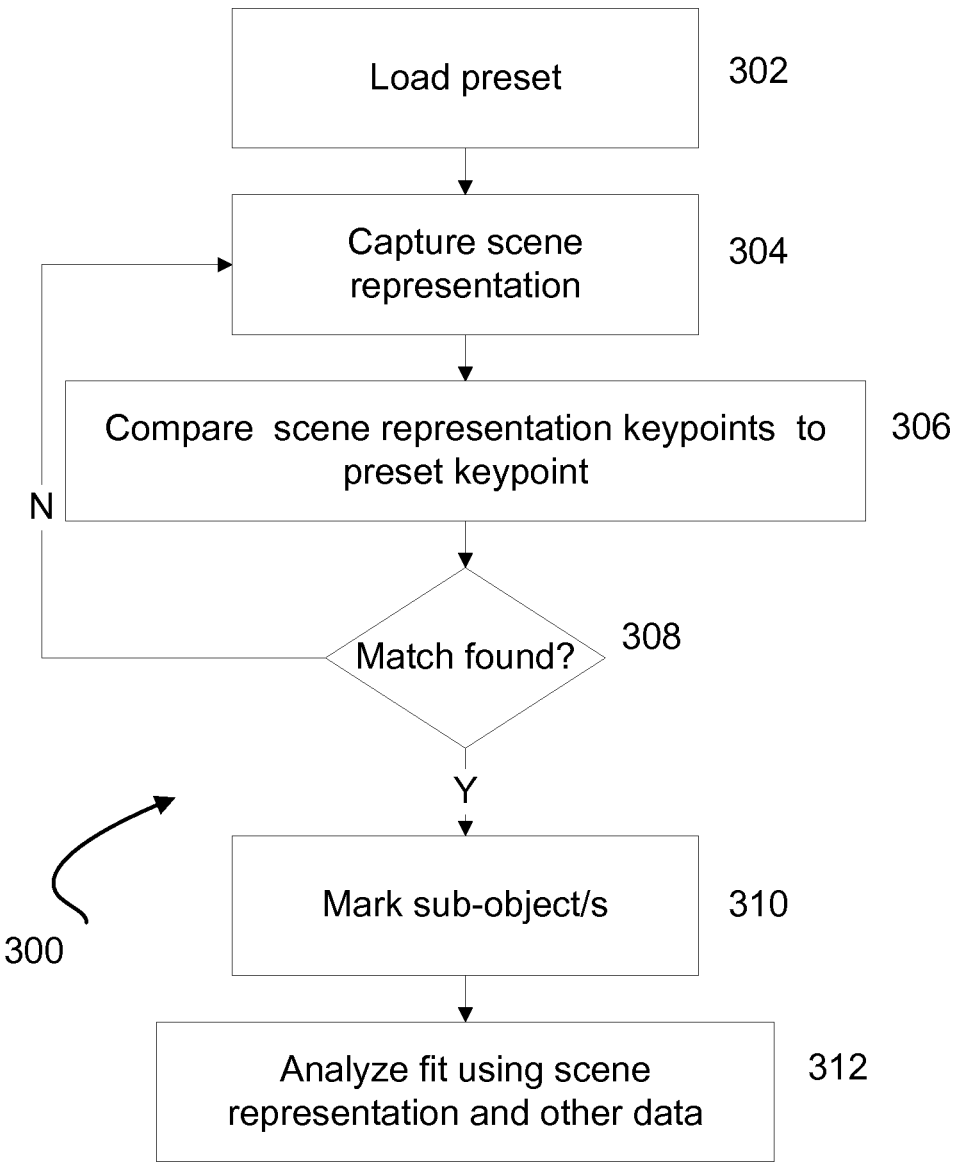
FIG. 3 illustrates an exemplary method of capturing and matching of a visual representation, according to some embodiments of the invention.

FIG. 3 illustrates an exemplary method of capturing and matching a visual representation, according to some embodiments of the invention.

The flowchart describes a sub-process and sub-system 200 to capture and match visual representations comprising of the following steps: (i) loading a present 302 such as planogram or a model of a healthy leaf. The preset may include pre calculated keypoints such as keypoints of a product such as a cereal box 122; (ii) capturing a scene representation such as taking a photo of 120 (304); (iii) compare scene representation keypoints to preset keypoint 306, for example, calculating SIFT keypoints for the scene representation and trying to match them to the preset keypoints of the cereal box; (iv) In case enough percent of absolute number of matches were found 308 the sub object is marked 310. For example, cereal box 122 is marked as present on scene 120. If not step 304 is performed again.

A fit may be calculated (312) for scene 120 against a preset. For example, in case the preset is comprised of a required planogram defining the presence of products 122, 124, 128 and space 126 and their relative positions in space a fit may be calculated between the scene and the planogram.

For example, the fit may validate specified rules such as their relative distances and angles and mark the planogram as "Pass" or "Fail", according to the percent of rules passed. The fit may take in account other data as defined in content analysis. For example, the location based data may select a desired planogram for a specific store from a variety of stores.

In a non-limiting example, the analysis may adventitiously provide time based analysis of moles such as 162 since a mole may be a melanoma i.e. skin cancer. However, it is hard to map all the moles on human body including their position on the body. The preset may maintain the keypoints of a photo of a mole that was taken on a given year Y. In Year Y+1 the various moles on the same body may be captured again. Sub system 300 may match photos of the moles captured in year Y to photos captured in year Y+1. Then analyze the moles: (i) area; (ii) borders; (iii) color and diameter, may be compared to find suspects for symptoms of skin cancer using keypoint descriptors. In yet another non-limiting example, inflamed tonsils can be detected using a baseline and current photos.

In the above description, an embodiment is an example or implementation of the inventions. The various appearances of "one embodiment", "an embodiment", or "some embodiments", do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment", or "other embodiments", means that a particular feature, structure, or characteristic described in connection with the embodiments is included in at least some embodiments, but not necessarily all embodiments, of the inventions.

It is to be understood that the phraseology and terminology employed herein are not to be construed as limiting, and are for descriptive purposes only.

The principles and uses of the teachings of the present invention may be better understood with reference to the accompanying description, Figures, and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting", and grammatical variants thereof do not preclude the addition of one or more components, features, steps, or integers; or groups thereof, and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques, and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for generating a marketplace status report, comprising:
    a mobile device having an image sensor adapted to capture an image sequence of at least shelf space in a marketplace;
    a database locally stored on said mobile device and adapted to store at least one planogram;
    a processing unit integrated in said mobile device and adapted to perform an image processing analysis during which a visual representation of said at least shelf space is extracted from said image sequence, said visual representation is matched against said at least one planogram based on a visual similarity, and at least one storage management data is automatically identified based on said at least one planogram, said processing unit is further adapted to perform an analysis of said at least one identified storage management data to identify buying patterns of at least one product presented on said at least shelf space; and
    a presentation unit integrated in said mobile device and adapted to present, as an outcome of said image processing analysis, an indication of said at least one storage management data and of said identified buying patterns;
    wherein said image processing analysis is performed by a GPU comprising a plurality of cores using an algorithm executed in a piece at a time on a plurality of different cores in parallel and put back together at the end, providing the outcome in real time; and
    wherein said visual similarity denotes a measure of resemblance between said visual representation and said at least one planogram.

2. The system of claim 1, wherein said image sequence is captured while moving said mobile device.

3. The system of claim 1, wherein said at least one storage management data comprises an indication of shelf space of each of a plurality of products in said of at least shelf space.

4. The system of claim 1, wherein said at least one storage management data comprises an indication of a share of empty space in said of at least shelf space.

5. The system of claim 1, wherein said at least one storage management data comprises supplier payment data of each of a plurality of products in said of at least shelf space.

6. The system of claim 1, wherein said at least one storage management data comprises status of each of a plurality of products in said of at least shelf space.

7. The system of claim 1, wherein said at least one storage management data comprises a full inventory of a plurality of products in said of at least shelf space.

8. The system of claim 1, wherein said at least one storage management data comprises new products in said of at least shelf space which do not appear in said at least one planogram.

9. The system of claim 1, wherein said processing unit is adapted to perform a comparison between different products in said of at least shelf space based on said outcome.

10. The system of claim 1, wherein said at least one storage management data comprises an indication of a presence or absence of products in positions in said said at least one planogram.

11. The system of claim 1 further comprising means to attach said mobile device to a human body.

12. The system of claim 1, wherein said processing unit performs an analysis of said visual representation in light of a location based analysis of localization data acquired by said mobile device.

13. The system of claim 12, wherein said localization data is selected from a group consisting of: global positioning system data, triangulation data, Global system for mobile communications (GSM) network data, Wi-Fi network data, and a radio frequency identification data.

14. The system of claim 1, wherein said processing unit performs an analysis of said visual representation in light of an analysis of historical data.

15. The system of claim 1, wherein said image sequence is part of video data captured using said image sensor.

16. The system of claim 1, wherein said image processing analysis is performed while further image capturing is performed.

17. A computerized method for generating a marketplace status report, comprising:

Capturing, by a mobile device, an image sequence of at least shelf space in a marketplace;

Performing, by said mobile device, an image processing analysis during which a visual representation of said at least shelf space is extracted from said image sequence, matching, by said mobile device, said visual representation against at least one planogram based on a visual similarity to identify automatically at least one storage management data;

analyzing said at least one storage management data to identify buying patterns of at least one product presented on said at least shelf space; and presenting, on a presentation unit of said mobile device, as an outcome of said image processing analysis, an indication of said at least one storage management data;

wherein said image processing analysis is performed by a GPU comprising a plurality of cores using an algorithm executed in a piece at a time on a plurality of different cores in parallel and put back together at the end, providing the outcome in real time; and wherein said visual similarity denotes a measure of resemblance between said visual representation and said at least one planogram.

18. The method according to claim 17, wherein said analysis is performed in less than 5 seconds.

19. The method according to claim 17, wherein said matching comprises identifying keypoint descriptors in images of said image sequence, said keypoint descriptors describing an area of a specific point in an image of said visual representation.

20. The method of claim 17, wherein said at least one planogram includes precalculated keypoint descriptors, and said matching of said visual representation is based on matching scene representation keypoint descriptors extracted from said visual representation to said precalculated keypoint descriptors of said at least one planogram, wherein said scene representation keypoint descriptors describing an area of a specific point in an image of said visual representation.

21. The method of claim 17, wherein said at least one storage management data comprises new products in said at least shelf space which do not appear in said at least one planogram.

22. The method of claim 17, wherein said at least one planogram is selected according to a location based data analysis of localization data acquired by said mobile device.

* * * * *